(12) United States Patent
Bartolone et al.

(10) Patent No.: US 10,649,093 B2
(45) Date of Patent: May 12, 2020

(54) METHOD FOR DETERMINING PROTECTION LEVELS OF NAVIGATION SOLUTIONS, ASSOCIATED COMPUTER PROGRAM PRODUCT AND RECEIVER

(71) Applicant: Thales, Courbevoie (FR)

(72) Inventors: Patrick Bartolone, Valence (FR); Denis Bouvet, Valence (FR)

(73) Assignee: THALES, Courbevoie (FR)

( * ) Notice: Subject to any disclaimer, the term of this patent is extended or adjusted under 35 U.S.C. 154(b) by 105 days.

(21) Appl. No.: 15/946,591

(22) Filed: Apr. 5, 2018

(65) Prior Publication Data

US 2019/0049590 A1 Feb. 14, 2019

(30) Foreign Application Priority Data

Apr. 5, 2017 (FR) ..................................... 17 00369

(51) Int. Cl.
*G01S 19/20* (2010.01)
*G01S 19/42* (2010.01)
(Continued)

(52) U.S. Cl.
CPC ............ *G01S 19/20* (2013.01); *G01S 19/421* (2013.01); *G06F 17/11* (2013.01); *G06F 17/18* (2013.01)

(58) Field of Classification Search
CPC ........ G01S 19/20; G01S 19/15; G01S 19/421; G01S 19/215; G01S 19/252; G06F 17/11; G01C 21/165
(Continued)

(56) References Cited

U.S. PATENT DOCUMENTS

| 2010/0052979 A1* | 3/2010 | Trautenberg | ............ G01S 19/08 342/357.48 |
| 2012/0146851 A1* | 6/2012 | Fernandez | .............. G01S 19/02 342/357.58 |

(Continued)

FOREIGN PATENT DOCUMENTS

EP 2461182 A1 6/2012

OTHER PUBLICATIONS

Blanch et al., "Exclusion for Advanced RAIM: Requirements and a Baseline Algorithm", Proceedings of the 2014 International Techinal Meeting of the Institute of Navigation, ITM, 2014, San Diego, California, Jan. 27-29, 2014, pp. 99-107.

(Continued)

*Primary Examiner* — Harry K Liu
(74) *Attorney, Agent, or Firm* — Thompson Coburn LLP; Steven M. Ritchey (57) ABSTRACT

A method for determining protection levels that comprises a preliminary phase carried out at least one time and a main phase carried out upon determining each new navigation solution. The preliminary phase comprises the steps of acquiring a first error value, providing a set of numbers of monitored faults, determining a plurality of computation coefficients, and storing the set of determined computation coefficients. The main phase includes the steps of determining a current number of monitored faults, and determining a protection level of the corresponding navigation solution by using an integrity relationship and the computation coefficients determined during the preliminary phase.

12 Claims, 2 Drawing Sheets

(51) Int. Cl.
*G06F 17/11* (2006.01)
*G06F 17/18* (2006.01)

(58) Field of Classification Search
USPC .................................................. 342/357.58
See application file for complete search history.

(56) References Cited

U.S. PATENT DOCUMENTS

2013/0332065 A1\* 12/2013 Hakim ................. H04W 64/00
                                                        701/411
2017/0227650 A1\* 8/2017 Grobert ................ G01S 19/215

OTHER PUBLICATIONS

Blanch et al., "Baseline Advanced RAIM User Algorithm and Possible Improvements", IEEE Transactions on Aerospace and Electronic Systems, Jan. 2015, pp. 713-732, vol. 51, No. 1.
Search Report for FR Application 1700369 dated Jan. 26, 2018.

\* cited by examiner

METHOD FOR DETERMINING PROTECTION LEVELS OF NAVIGATION SOLUTIONS, ASSOCIATED COMPUTER PROGRAM PRODUCT AND RECEIVER

CROSS-REFERENCE TO RELATED APPLICATIONS

This application claims the benefit of French Application No. 1700369, filed on Apr. 5, 2017, which is incorporated herein by reference in its entirety.

FIELD OF THE INVENTION

The present invention relates to a method of determination of protection levels of navigation solutions.

The present invention also relates to a computer program product and a receptor associated with this method.

BACKGROUND OF THE INVENTION

In a manner known in itself, a navigation solution is determined by a mobile receptor from electromagnetic signals emitted by satellites of one or several satellite global positioning systems. Such a satellite, also called constellation, is known under the acronym GNSS (Global Navigation Satellite System").

There are currently several GNSS systems, which in particular include the GPS system, the GLONASS system and the GALILEO system.

Each navigation system generally comprises the geographical position of the mobile receptor, its speed and the time synchronized with the corresponding GNSS system.

In the context of applications using navigation systems for sensitive operations, for example aeronautic or maritime navigation, it is necessary to associate each determined navigation solution with a protection level characterizing the reliability of this navigation system.

Such a protection level is in particular determined from the likelihood of provision of a navigation solution whose error rate does not exceed a stated integrity threshold (also known as "Hazardous Misleading Information") and the likelihood of false alarm.

This protection level is further determined using redundant information relative to the corresponding navigation solution. This redundant information is in particular determined from electromagnetic signals emitted by satellites visible by the receptor when the number of these satellites exceeds the number of satellites necessary to determine a single navigation solution.

Different methods of making it possible to determine protection levels associated with the provided navigation solutions are already known in the state of the art.

Among these methods, the RAIM (Receiver Autonomous Integrity Monitoring) method makes it possible to determine protection levels from redundant information obtained from satellites visible from a single constellation based on the likelihood of fault of each of the satellites in this constellation.

An improved version of this method, called ARAIM (Advanced Receiver Autonomous Integrity Monitoring) is also known, which makes it possible to determine protection levels from redundant information obtained from satellites visible from several constellations. Relative to the RAIM method, this improved version allows greater availability of aeronautic receptors, in particular in approach phases.

To that end, the improved version takes account not only of the likelihoods of simple faults of the satellites of each constellation, but also the likelihoods of faults affecting several satellites at once. In order to determine the corresponding protection levels, this method uses an integrity relationship linking the likelihoods of providing an erroneous navigation solution and of raising a false alarm at the corresponding protection.

However, given that the integrity relationship has no analytical solution and includes mathematical functions that are costly to bring numerically together, the implementation of this improved method requires large computation capacities from the receptor. Indeed, to determine the protection levels in real time, it is necessary to numerically resolve the integrity relationship for each of the provided navigation solutions. This then makes it difficult, or even impossible in real time, to implement this method in receptors having limited computing capacities.

SUMMARY OF THE INVENTION

The present invention aims to propose a method for determining protection levels for navigation solutions that can be implemented by a receptor having relatively limited computing capacities, in real time and in a multi-constellation context.

To that end, the invention relates to a method for determining protection levels for navigation solutions, each navigation solution being determined from electromagnetic signals emitted by satellites of one or several satellite global positioning systems, called constellation.

The method comprises a preliminary phase and a main phase, the preliminary phase being carried out at least one time before the main phase, the main phase being carried out upon determining each new navigation solution.

The preliminary phase comprises the following steps:
for each predetermined dimension, acquiring a first error value corresponding to the likelihood of providing a navigation solution whose error rate does not exceed a predetermined integrity threshold according to this dimension and a second error value corresponding to the likelihood of determining a false alarm according to this dimension;
providing a set of numbers of monitored faults;
for each number of monitored faults and for each predetermined dimension, determining a plurality of computation coefficients, each computation coefficient being determined using the reverse function of a function defined using the distribution function of the Gaussian law, the reverse function being computed from a determined point based on the second error value corresponding to this dimension and the corresponding number of monitored faults and/or the first error value corresponding to this dimension;
storing the set of determined computation coefficients.

The main phase comprises the following steps:
determining a current number of monitored faults based on the number of constellations used and the number of satellites visible in each of these constellations;
determining a protection level of the corresponding navigation solution according to a given dimension using an integrity relationship and the computation coefficients determined during the preliminary phase for the current number of monitored faults and for this dimension, the integrity relationship analytically connecting this protection level and the first and second error values.

According to other advantageous aspects of the invention, the detection method comprises one or more of the following features, considered alone or according to all technically possible combinations:

at least some of the computation coefficients, called false alarm coefficients, are determined according to the following relationship:

$$K_{FA,dim} = Q^{-1}\left(\frac{P_{FA,dim}}{2N_{fault}}\right);$$

where $K_{FA,dim}$ is a false alarm coefficient according to the given dimension dim;

$P_{FA,dim}$ is the second error value according to the given dimension dim;

$N_{fault}$ is the corresponding number of monitored faults;

$Q^{-1}(x)$ is said reverse function at the point x;

for a given dimension, the integrity relationship comprises the false alarm coefficient according to this dimension;

the integrity relationship is written in the following form:

$$2Q\left(\frac{PL_{dim} - b_{dim}^{(0)}}{\sigma_{dim}^{(0)}}\right) + \sum_j p_{fault}^{(j)} Q\left(\frac{PL_{dim} - \sigma_{dim}^{(0-j)} K_{FA,dim} - b_{dim}^{(j)}}{\sigma_{dim}^{(j)}}\right) =$$

$$P_{HMI,dim} - P_{faults\ not\ monitored,dim},$$

where $PL_{dim}$ is the protection level to be determined according to the given dimension dim;

j is the index of a monitored fault varying from 1 to $N_{fault}$;

$p_{fault}^{(j)}$ is the likelihood of occurrence of the fault having index j;

$P_{HMI,dim}$ is the first error value according to the given dimension dim;

$P_{faults\ not\ monitored,dim}$ is the sum of the likelihoods of occurrence of unmonitored faults according to the given dimension dim; and $\sigma_{dim}^{(0)}$, $\sigma_{dim}^{(j)}$, $\sigma_{dim}^{(0-j)}$, $b_{dim}^{(0)}$ and $b_{dim}^{(j)}$ are different statistical data obtained from the navigation solution according to the given dimension dim and a plurality of sub-solutions according to the given dimension dim, each sub-solution being associated with the index j and corresponding to a navigation solution calculated according to the hypothesis that the fault having index j has occurred;

at least some of the computation coefficients, called first low border coefficients, are determined according to the following relationship:

$$K_{FF(0),dim} = Q^{-1}\left(\frac{P_{HMI,dim} - P_{faults\ not\ monitored,dim}}{2}\right);$$

where $K_{FF(0),dim}$ is a first low border coefficient according to the given dimension dim;

$P_{HMI,dim}$ is the first error value according to the given dimension dim;

$P_{faults\ not\ monitored,dim}$ is the sum of the likelihoods of occurrence of unmonitored faults according to the given dimension dim; and $Q^{-1}(x)$ is said reverse function at the point x;

at least some of the computation coefficients, called first high border coefficients, are determined according to the following relationship:

$$K_{FFR(0),dim} = Q^{-1}\left(\frac{P_{HMI,dim} - P_{faults\ not\ monitored,dim}}{2(N_{fault} + 1)}\right);$$

where $K_{FFR(0),dim}$ is a first high border coefficient according to the given dimension dim;

$P_{HMI,dim}$ is the first error value according to the given dimension dim;

$P_{faults\ not\ monitored,dim}$ is the sum of the likelihoods of occurrence of unmonitored faults according to the given dimension dim; and $N_{fault}$ is the corresponding number of monitored faults;

$Q^{-1}(x)$ is said reverse function at the point x;

at least some of the computation coefficients, called second low border coefficients and second high border coefficients, are further determined according to the likelihood of occurrence of a fault from among the monitored faults;

the second low border coefficients are determined according to the following relationship:

$$K_{FF,dim} = Q^{-1}\left(\frac{P_{HMI,dim} - P_{faults\ not\ monitored,dim}}{p_{fault}^{(j)}}\right);$$

where $K_{FF,dim}$ is a second low border coefficient according to the given dimension dim;

$P_{HMI,dim}$ is the first error value according to the given dimension dim;

$P_{faults\ not\ monitored,dim}$ is the sum of the likelihoods of occurrence of unmonitored faults according to the given dimension dim;

j is the index of a monitored fault varying from 1 to $N_{fault}$;

$N_{fault}$ is the number of monitored faults;

$p_{fault}^{(j)}$ is the likelihood of occurrence of the fault having index j; and $Q^{-1}(x)$ is said reverse function at the point x;

the second high border coefficients are determined according to the following relationship:

$$K_{FFR,dim} = Q^{-1}\left(\frac{P_{HMI,dim} - P_{faults\ not\ monitored,dim}}{p_{fault}^{(j)}(N_{fault} + 1)}\right);$$

where $K_{FFR,dim}$ is a second low border coefficient according to the given dimension dim;

$P_{HMI,dim}$ is the first error value according to the given dimension dim;

$P_{faults\ not\ monitored,dim}$ is the sum of the likelihoods of occurrence of unmonitored faults according to the given dimension dim;

$N_{fault}$ is the corresponding number of monitored faults;

j is the index of a monitored fault varying from 1 to $N_{fault}$;

$p_{fault}^{(j)}$ is the likelihood of occurrence of the fault having index j; and $Q^{-1}(x)$ is said reverse function at the point x;

during the main phase, the corresponding protection level is determined from the integrity relationship using the dichotomy method starting from a low border and a high border;

the low border being determined as a function of the first and second low border coefficients corresponding to the current number of monitored faults and the given dimension; and the high border being determined as a function of the first and second high border coefficients corresponding to the current number of monitored faults and the given dimension.

The invention also relates to a computer program product including software instructions which, when implemented by computer equipment, carry out a method as defined above.

The invention also relates to a receptor including means configured to carry out a method as defined above.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF THE INVENTION

Figure 1:
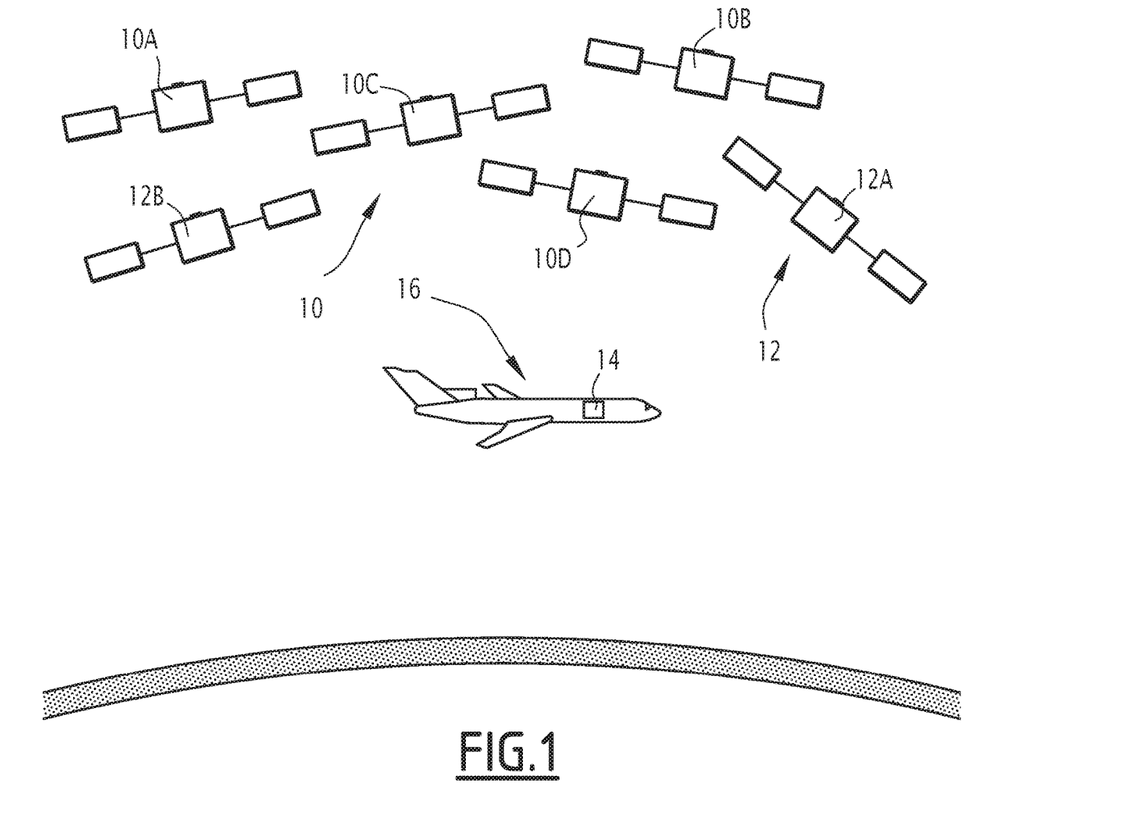
FIG. 1 is a schematic view of two global navigation satellite systems and a receptor according to the invention.

FIG. 1 in fact illustrates two global positioning satellite systems 10, 12 and one receptor 14.

Each global positioning satellite system 10, 12, subsequently called constellation, is a type of GNSS (Global Navigation Satellite System) including satellites able to emit electromagnetic signals toward the Earth's surface. These electromagnetic signals in particular encode information relative to the moment of their emission.

In the example of FIG. 1, the system 10 is for example the GPS system and the system 12 is for example the GLONASS system. The system 10 for example includes at least four satellites, respectively 10A to 10D, visible by the receptor 14 and the system 12 for example includes at least two satellites, respectively 12A and 12B, visible by the receptor 14.

It should be noted that in the general case, the number of satellites visible by the receptor 14 changes with time and with the movement of this receptor.

The receptor 14 is able to receive electromagnetic signals emitted by visible satellites 10A to 10D and 12A and 12B from its current position.

The receptor 14 is in particular able to extract, from received electromagnetic signals, the information relative to the moment of their emission. From this information and knowing the position of each of the satellites, the receptor 14 is able to determine at least one navigation solution according to methods known in themselves.

This determined navigation solution in particular comprises the position of the receptor 14 in a land-based coordinate system, its speed and the time synchronized with the system 10 or 12.

The receptor 14 is for example used in the context of aeronautic navigation. It is thus for example on board an aircraft 16 in order provide the geographical position of this aircraft 16 during piloting thereof.

Figure 2:
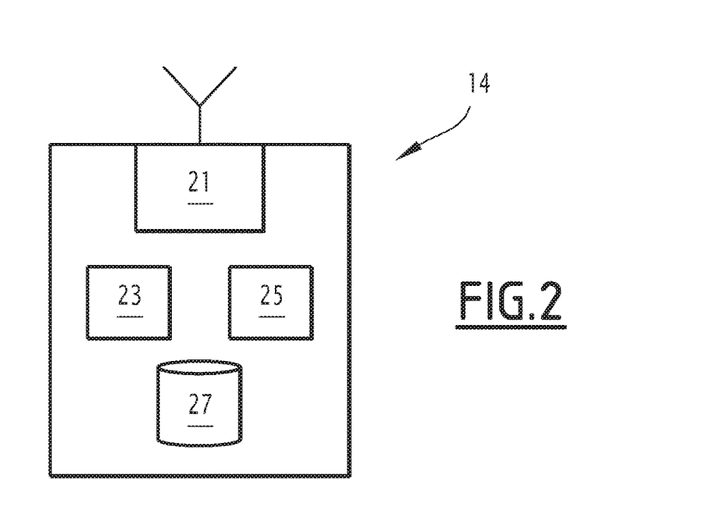
FIG. 2 is a detailed schematic view of the receptor of FIG. 1.

The receiver 14 is illustrated in more detail in FIG. 2.

Thus, in reference to this FIG. 2, the receptor includes an antenna 21 able to receive electromagnetic signals coming from satellites of the system 10, 12, a module 23 for computing navigation solutions, a module 25 for computing protection levels and a database 27.

The receptor 14 for example at least partially assumes the form of an on board computer further including a processor and a memory able in particular to store a plurality of software programs that the processor is able to execute.

In this case, the modules 23 and 25 assume the form of software programs stored in the memory and run by the processor. The database 27 is also stored in this memory.

According to another example embodiment, the modules 23 and 25 assume the form of integrated circuits.

The navigation solution computation module 23 makes it possible to determine, from electromagnetic signals received by the antenna 21, at least one navigation solution, called main solution, as previously explained.

This solution is determined according to at least one predetermined dimension dim and under the hypothesis that all of the visible satellites 10A to 10D, 12A and 12B are operational.

Each predetermined dimension dim is for example chosen in a group including:
  north direction;
  east direction;
  high direction;
  reference time of the system 10;
  reference time of the system 12.

The number of elements in this group will be denoted hereinafter by $N_{dim}$.

The navigation solution computation module 23 further makes it possible to determine redundant information relative to the main solution. This redundant information comprises a plurality of sub-solutions according to at least one dimension dim.

Each sub-solution is associated with the index j varying from 1 to $N_{fault}$, where $N_{fault}$ is a current number of monitored faults, the meaning of which will be explained hereinafter.

The sub-solution associated with the index j is determined under the hypothesis that the fault having the index j has occurred, according to methods known in themselves.

The protection level computation module 25 makes it possible, for each navigation solution determined by the module 23, to determine a protection level $PL_{dim}$ according to a given dimension dim while monitoring $N_{fault}$ faults likely to occur in the systems 10, 12.

The protection level computation module 25 is in particular able to carry out a method for determining protection levels according to the invention described in more detail below.

As previously mentioned, each monitored fault is identified by the index j then varying from 1 to $N_{fault}$.

Each fault is associated with a fault type. In the described example, each fault type is chosen from the group comprising:
  single; and
  multiple.

The number of elements comprised in this group will be denoted hereinafter by $N_{type}$.

A fault is of the single type when it affects a single satellite of one of the constellations.

A fault is of the multiple type when it affects at least two satellites of a same constellation. In this case, any constellation is considered faulty.

Furthermore, each fault is associated with a fault value $p_{fault}^{(j)}$ corresponding to the likelihood of occurrence of this fault.

According to the described example, the fault values $p_{fault}^{(j)}$ associated with a same type of fault are equal to one another.

Each protection level $PL_{dim}$ according to the dimension dim is in particular determined as a function of a first error value $P_{HMI,dim}$ corresponding to the likelihood of provision of a navigation solution whose error rate does not exceed a predetermined integrity threshold and a second error value $P_{FA,dim}$ corresponding to the likelihood of false alarm, according to this dimension dim.

Each protection level $PL_{dim}$ according to the dimension dim then defines a protection radius according to this dimension dim of the corresponding navigation solution below which this solution according to the dimension dim is guaranteed with the likelihood $1-p_{HMI\ reduced,dim}$, where $p_{HMI\ reduced,dim}$ corresponds to the first error value $P_{HMI,dim}$ reduced by the sum of the likelihoods of occurrence of unmonitored faults according to the dimension dim.

In particular, $$p_{HMI\ reduced,dim} = P_{HMI,dim} P_{faults\ not\ monitored,dim},$$

where $P_{faults\ not\ monitored,dim}$ is the sum of the likelihoods of occurrence of unmonitored faults according to the dimension dim. This value $P_{faults\ not\ monitored,dim}$ is predetermined for each dimension dim and is below the value $P_{HMI,dim}$.

The database 27 is able to store at least certain data necessary to carry out the determination method, as will be explained below.

Figure 3:
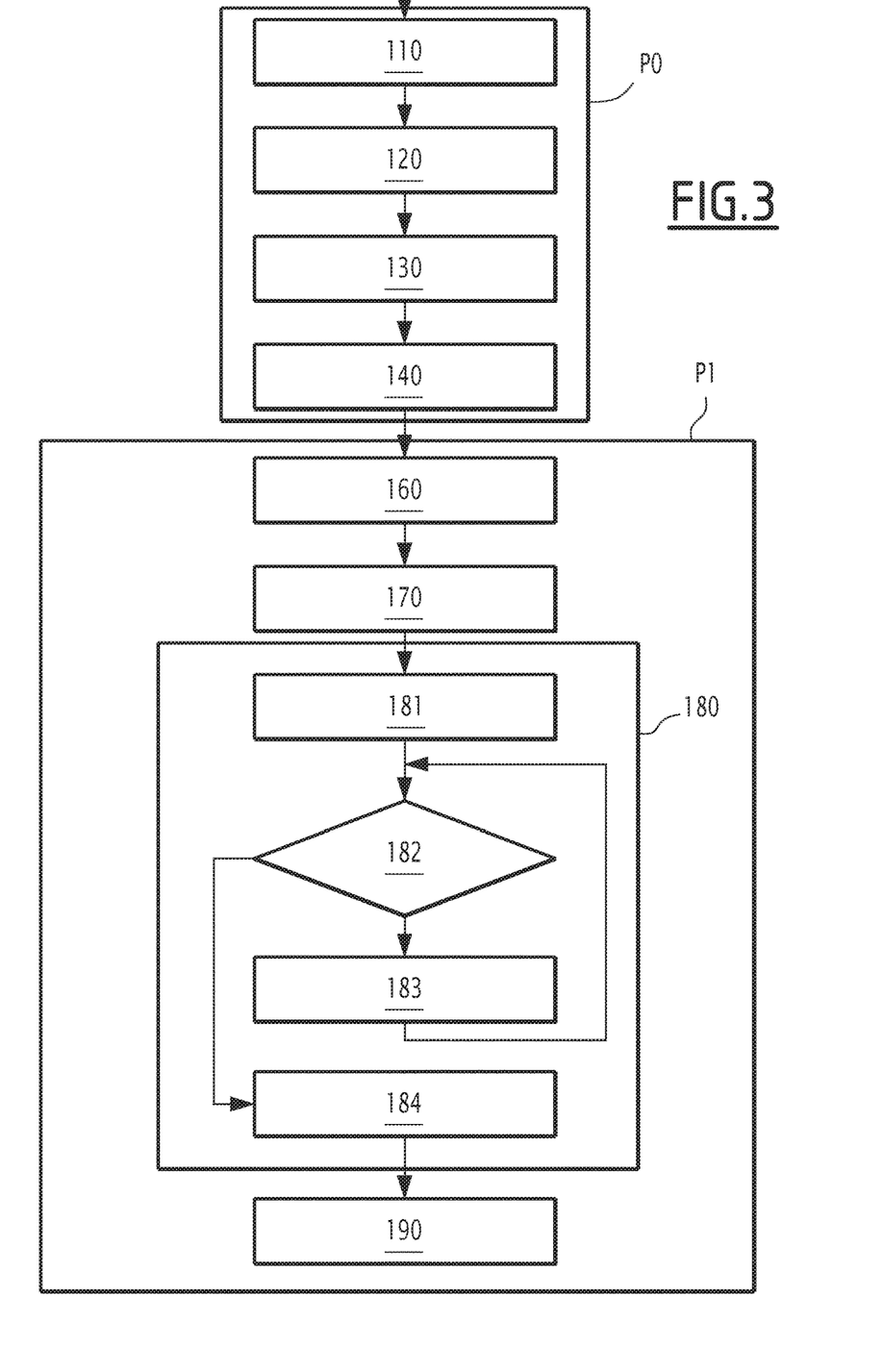
FIG. 3 is a flowchart of a method for determining the protection levels of navigation solutions according to the invention, the method being carried out by the receptor of FIG. 1.

The method for determining protection levels according to the invention will now be explained in reference to FIG. 3, showing a flowchart of its steps.

This method comprises a preliminary phase $P_0$ and a main phase $P_1$. The preliminary phase $P_0$ is carried out at least one time before the main phase $P_1$.

In particular, the preliminary phase $P_0$ is carried out upon each change of at least one of the values from among the first and second error values $P_{HMI,dim}$, $P_{FA,dim}$ according to at least one given dimension dim or at least one of the fault values $p_{fault}^{(j)}$.

During the initial step 110 of the preliminary phase $P_0$, the protection level computation module 25 acquires the first and second error values $P_{HMI,dim}$, $P_{FA,dim}$ according to each predetermined dimension dim. During the same step, the protection level computation module 25 further acquires, according to each predetermined dimension dim, the values $P_{faults\ not\ monitored,dim}$ and bias values $b_{dim}^{(j)}$ whose meaning will be explained later.

The set of these values is for example provided during the design or maintenance of the receptor 14 by external databases provided to that end, or during execution via an external link.

According to an alternative embodiment, these values are provided upon starting up the receptor 14, for example when the aircraft 16 is on the ground preparing for flight. During the following step 120, the protection level computation module 25 acquires a set E of numbers $N_{fault}$ of monitored failures. The number of elements in the set E will be denoted hereinafter by |E|.

Thus, for example, if the hypotheses of fault occurrence lead to monitoring only multiple-type faults of the system 12 and single-type faults of both systems 10, 12, for a navigation solution using between 4 and 12 satellites of the system 10 and between 2 and 12 satellites of the system 12, the set E contains 19 natural numbers $N_{fault}$ varying from 7 to 25. Each of these numbers $N_{fault}$ therefore corresponds to the number of faults that may be monitored during the main phase P1.

Then, during the same step, for each type of fault, the protection level computation module 25 acquires a fault value $p_{fault}^{(j)}$.

Like in the previous step, the set E and the fault values $p_{fault}^{(j)}$ for example provided by external databases during the design or maintenance of the receptor 14. It should be noted that the fault values $p_{fault}^{(j)}$ as well as the bias values $b_{dim}^{(j)}$ can be updated later, in particular during the execution of the main phase $P_1$, for example via an external link. In this case, at least some of the steps of the preliminary phase $P_0$ are carried out again in order to account for these changes.

During the following step 130, the protection level computation module 25 determines, for each dimension dim and optionally for each number of monitored faults $N_{fault}$ of the set E and/or for each type of fault, a plurality of computation coefficients, among which are:

false alarm coefficients $K_{FA,dim}$;
first low border coefficients $K_{FF(0),dim}$;
first high border coefficients $K_{FF(0),dim}$;
second low border coefficients $K_{FF,dim}$; and
second high border coefficients $K_{FFR,dim}$.

Each computation coefficient according to a given dimension dim is determined using the reverse function of a function defined using the distribution function of the Gaussian law, this reverse function being computed from a determined point based on the second error value $P_{FA,dim}$ corresponding to this dimension dim and the corresponding number of monitored faults $N_{fault}$ and/or the first error value corresponding to this dimension $P_{HMI,dim}$.

In particular, each false alarm coefficient $K_{FA,dim}$ for a given dimension dim and a given number of monitored faults $N_{fault}$ is determined according to the following relationship:

$$K_{FA,dim} = Q^{-1}\left(\frac{P_{FA,dim}}{2N_{fault}}\right);$$

where $Q^{-1}(x)$ is the reverse function of a function Q defined using the distribution function of the Gaussian law $F_G$.

In the present description, the Gaussian law $F_G$ is defined by the following relationship:

$$F_G(y) = 1/\sqrt{2\pi} \int_{-\infty}^{y} e^{-\frac{u^2}{2}} du.$$

According to one example embodiment, the function Q is defined as follows:

$$x = Q(y) = 1 - F_G(y) = 1/\sqrt{2\pi} \int_{y}^{+\infty} e^{-\frac{u^2}{2}} du.$$

In this case, the function Q therefore corresponds to the tail of the Gaussian law $F_G$.

According to another example embodiment, the function Q is defined as follows:

$$x = Q(y) = \begin{cases} 1 - F_G(y) = 1/\sqrt{2\pi} \int_y^{+\infty} e^{-\frac{u^2}{2}} du, & \text{for, } y > 0, \\ 1, & \text{for, } y \leq 0. \end{cases}$$

In this case, the function Q corresponds to the tail of the Gaussian law $F_G$ for each variable greater than zero and is equal to 1 for each variable less than or equal to zero.

Thus, during this step $|E| \times N_{dim}$, coefficients $K_{FA,dim}$ are determined. When $|E|=19$ and $N_{dim}=2$, the number of coefficients $K_{FA,dim}$ determined during this step is therefore equal to 38.

Each first low border coefficient $K_{FF(0),dim}$ for a given dimension dim is determined by the following relationship:

$$K_{FF(0),dim} = Q^{-1}\left(\frac{p_{HMI\ reduced,dim}}{2}\right).$$

Thus, during this step $N_{dim}$, coefficients $K_{FF(0),dim}$ are determined.

Each first high border coefficient $K_{FFR(0),dim}$ for a given dimension dim and a given number of monitored faults $N_{fault}$ is determined by the following relationship:

$$K_{FFR(0),dim} = Q^{-1}\left(\frac{p_{HMI\ reduced,dim}}{2(N_{fault}+1)}\right).$$

Thus, during this step $|E| \times N_{dim}$, coefficients $K_{FFR(0),dim}$ are determined.

When $|E|=19$ and $N_{dim}=2$, the number of coefficients $K_{FFR(0),dim}$ determined during this step is therefore equal to 38.

Each second low border coefficient $K_{FF,dim}$ is determined for a given dimension dim and a given type of fault, according to the following relationship:

$$K_{FF,dim} = Q^{-1}\left(\frac{p_{HMI\ reduced,dim}}{p_{fault}^{(j)}}\right).$$

Thus, during this step $N_{type} \times N_{dim}$, coefficients $K_{FF,dim}$ are determined.

When $N_{type}=2$ and $N_{dim}=2$, the number of coefficients $K_{FF,dim}$ determined during this step is therefore equal to 4.

Each second low border coefficient is determined for a given dimension dim, a given type of fault and a given number of monitored faults $N_{fault}$, according to the following relationship:

$$K_{FFR,dim} = Q^{-1}\left(\frac{p_{HMI\ reduced,dim}}{p_{fault}^{(j)}(N_{fault}+1)}\right).$$

Thus, during this step $|E| \times N_{dim} \times N_{type}$, coefficients $K_{FFR,dim}$ are determined.

When $|E|=19$, $N_{type}=2$ and $N_{dim}=2$, the number of coefficients $K_{FFR,dim}$ determined during this step is therefore equal to 76.

During the final step 140 of the preliminary phase $P_0$, the protection level computation module 25 stores the set of computation coefficients determined in the database 27, for example in the form of a plurality of tables.

The main phase $P_1$ is carried out when it is necessary to determine a protection level $PL_{dim}$ according to a given dimension dim for a navigation solution determined by the navigation solution computation module 23.

Thus, the main phase $P_1$ is carried out after determining each new navigation solution.

During the initial step 160 of this main phase P1, the protection level computation module 25 determines the current number $N_{fault}$ of monitored failures corresponding to one of the numbers of the set E. The current number $N_{fault}$ is determined for example based on the number of satellites visible by the receptor 14.

Then, during the same step, the protection level computation module 25 determines the main navigation solution as well as the sub-solutions determined by the navigation solution computation module 25.

During the following step 170, the protection level computation module 25 determines the statistical data relative to the main solution and the acquired sub-solutions.

In particular, during this step, the protection level computation module 25 determines the following statistical data:

- $\sigma_{dim}^{(0)}$ corresponding to the standard deviation of the main solution according to the dimension dim;
- $\sigma_{dim}^{(j)}$ corresponding to the standard deviation of the sub-solution j according to the dimension dim;
- $\sigma_{dim}^{(0-j)}$ corresponding to the standard deviation of the distance separating the main solution from the sub-solution j according to the dimension dim; and
- $b_{dim}^{(j)}$ corresponding to the cumulative effect of the nominal biases on the measurements used in the computation of the main solution (for j=0) and sub-solutions (for j≥1) according to the dimension dim.

The values $b_{dim}^{(j)}$ can also be updated during different iterations of the main phase $P_1$, for example via an external link.

During the following step 180, the protection level computation module 25 determines the corresponding protection level $PL_{dim}$ according to at least one given dimension dim, from an integrity relationship analytically connecting this protection level $PL_{dim}$ and the first and second error values $P_{HMI,dim}$, $P_{FA,dim}$.

In particular, for a given dimension dim, the integrity relationship is written in the following form:

$$F(PL_{dim}) = 2Q\left(\frac{PL_{dim} - b_{dim}^{(0)}}{\sigma_{dim}^{(0)}}\right) + \sum_j p_{fault}^{(j)} Q\left(\frac{PL_{dim} - \sigma_{dim}^{(0-j)} K_{FA,dim} - b_{dim}^{(j)}}{\sigma_{dim}^{(j)}}\right) = p_{HMI\ reduced,dim}$$

To solve the equation $F(PL_{dim}) = p_{HMI\ reduced,dim}$, the protection level computation module 25 implements a numerical method, for example the dichotomy resolution method.

Step 180 thus comprises several sub-steps.

According to the initial sub-step 181, the protection level computation module 25 determines, for the desired protection level $PL_{dim}$, a low border $PL_{low,dim}$ and a high border $PL_{hi,dim}$.

These borders are determined from the following relationships:

$$PL_{low,dim} = \max\left\{K_{FF(0),dim}\sigma_{dim}^{(0)}, \max_j\left\{K_{FF,dim}\sigma_{dim}^{(j)} + K_{FA,dim}\sigma_{dim}^{(0-j)}\right\}\right\},$$

$$PL_{hi,dim} = \max\left\{K_{FFR(0),dim}\sigma_{dim}^{(0)}, \max_j\left\{K_{FFR,dim}\sigma_{dim}^{(j)} + K_{FA,dim}\sigma_{dim}^{(0-j)}\right\}\right\}.$$

In order to determine these borders, the protection level computation module 25 therefore uses the computation coefficients $K_{FF(0),dim}$, $K_{FFR(0),dim}$, $K_{FF,dim}$, $K_{FFR,dim}$ and $K_{FA,dim}$ determined during the preliminary phase $P_0$ and stored in the database 27, for the corresponding dimension dim and optionally, for the current number of monitored faults $N_{fault}$ and for the corresponding fault type.

During the following sub-step 182, the protection level computation module 25 determines the difference between the high $PL_{hi,dim}$ and low $PL_{low,dim}$ borders. If this difference is above a predetermined tolerance threshold, the module 25 goes to sub-step 183. Otherwise, the module 25 goes to sub-step 184.

During sub-step 183, the protection level computation module 25 determines a median protection level $PL_{med}$ according to the following relationship:

$$PL_{med} = \frac{PL_{low,dim} + PL_{hi,dim}}{2}.$$

Then, the protection level computation module 25 computes the function $F(PL_{med})$ in this median protection level $PL_{med}$.

The function $F(PL_{med})$ is therefore computed using the coefficient $K_{FA,dim}$ stored in the database 27 for the dimension dim and the current number of corresponding monitored faults $N_{fault}$.

When this function $F(PL_{med})$ is greater than the right part of the integrity relationship, i.e., greater than $p_{HMI\ reduced,dim}$ the protection level computation module 25 associates a new low border $PL_{low,dim}$ with this median protection level $PL_{med}$.

Otherwise, the protection level computation module 25 associates a new high border $PL_{hi,dim}$ with this median protection level $PL_{med}$.

Then, at the end of this sub-step 183, the protection level computation module 25 goes to sub-step 182, during which it again compares the difference between the high $PL_{hi,dim}$ and low $L_{low,dim}$ borders, one of these values having been modified during sub-step 182, with the tolerance threshold.

Lastly, during sub-step 184, the protection level computation module 25 associates the desired protection level $PL_{dim}$ for example with the low border $PL_{low,dim}$.

During the final step 190 of the method, the protection level computation module 25 transmits the obtained protection level $PL_{dim}$ to the navigation solution computation module 23, which for example raises an alarm when this level is below a predetermined threshold.

One can see that the present invention has a certain number of advantages.

The protection level determination method according to the invention makes it possible to greatly accelerate the computation of protection levels by making its implementation possible even on receptors having limited computation capacities, and in real time.

Such an effect has been achieved owing to the use of the preliminary phase during which a certain number of coefficients are computed prior to implementing the main phase. These coefficients are stored in a database provided for that purpose and are accessible at any time during the execution of the main phase.

Thus, it is no longer necessary to recalculate these coefficients for each navigation solution, such that the resolution of the integrity relationship is accelerated greatly. In particular, it is no longer necessary to recalculate the reverse function $Q^{-1}$ of the function $Q$ in real time, which is a particular advantage of the invention.

Lastly, it is possible to adapt the existing receptors to the implementation of the method according to the invention in a particularly simple manner, for example by updating their software. This then presents a particularly advantageous aspect of the invention.

The invention claimed is:

1. A method for determining protection levels for navigation solutions, each navigation solution being determined from electromagnetic signals emitted by satellites of one or several satellite global positioning systems, called constellation, the method comprising a preliminary phase and a main phase, the preliminary phase being carried out at least one time before the main phase, the main phase being carried out upon determining each new navigation solution;
wherein the preliminary phase comprises the following steps:
for each predetermined dimension, acquiring a first error value corresponding to the likelihood of providing a navigation solution whose error rate does not exceed a predetermined integrity threshold according to this dimension and a second error value corresponding to the likelihood of determining a false alarm according to this dimension;
providing a set of numbers of monitored faults;
for each number of monitored faults and for each predetermined dimension, determining a plurality of computation coefficients, each computation coefficient being determined using the reverse function of a function defined using the distribution function of the Gaussian law, the reverse function being computed from a determined point based on the second error value corresponding to this dimension and the corresponding number of monitored faults and/or the first error value corresponding to this dimension;
storing the set of determined computation coefficients; and
wherein the main phase comprises the following steps:
determining a current number of monitored faults based on the number of constellations used and the number of satellites visible in each of these constellations; and
determining a protection level of the corresponding navigation solution according to a given dimension using an integrity relationship and the computation coefficients determined during the preliminary phase for the current number of monitored faults and for this dimension, the integrity relationship analytically connecting this protection level and the first and second error values.

2. The method according to claim 1, wherein at least some of the computation coefficients, called false alarm coefficients are determined according to the following relationship:

$$K_{FA,dim} = Q^{-1}\left(\frac{P_{FA,dim}}{2N_{fault}}\right);$$

wherein $K_{FA,dim}$ is a false alarm coefficient according to the given dimension dim;

$P_{FA,dim}$ is the second error value according to the given dimension dim;

$N_{fault}$ is the corresponding number of monitored faults; and $Q^{-1}(x)$ is said reverse function at the point x.

3. The method according to claim 2, wherein, for a given dimension, the integrity relationship comprises the false alarm coefficient according to this dimension.

4. The method according to claim 2, wherein the integrity relationship is written in the following form:

$$2Q\left(\frac{PL_{dim} - b_{dim}^{(0)}}{\sigma_{dim}^{(0)}}\right) + \sum_j p_{fault}^{(j)} Q\left(\frac{PL_{dim} - \sigma_{dim}^{(0-j)}K_{FA,dim} - b_{dim}^{(j)}}{\sigma_{dim}^{(j)}}\right) =$$

$$P_{HMI,dim} - P_{faults\ not\ monitored,dim},$$

wherein $PL_{dim}$ is the protection level to be determined according to the given dimension dim;

j is the index of a monitored fault varying from 1 to $N_{fault}$;

$p_{fault}^{(j)}$ is the likelihood of occurrence of the fault having index j;

$P_{HMI,dim}$ is the first error value according to the given dimension dim;

$P_{faults\ not\ monitored,dim}$ is the sum of the likelihoods of occurrence of unmonitored faults according to the given dimension dim; and $\sigma_{dim}^{(0)}$, $\sigma_{dim(j)}$, $\sigma_{dim}^{(0-j)}$, $b_{dim}^{(0)}$ and $b_{dim}^{(j)}$ are different statistical data obtained from the navigation solution according to the given dimension dim and a plurality of sub-solutions according to the given dimension dim, each sub-solution being associated with the index j and corresponding to a navigation solution calculated according to the hypothesis that the fault having index j has occurred.

5. The method according to claim 1, wherein at least some of the computation coefficients, called first low border coefficients, are determined according to the following relationship:

$$K_{FF(0),dim} = Q^{-1}\left(\frac{P_{HMI,dim} - P_{faults\ not\ monitored,dim}}{2}\right);$$

wherein $K_{FF(0),dim}$ is a first low border coefficient according to the given dimension dim;

$P_{HMI,dim}$ is the first error value according to the given dimension dim;

$P_{faults\ not\ monitored,dim}$ is the sum of the likelihoods of occurrence of unmonitored faults according to the given dimension dim; and $Q^{-1}(x)$ is said reverse function at the point x.

6. The method according to claim 1, wherein at least some of the computation coefficients, called first high border coefficients, are determined according to the following relationship:

$$K_{FFR(0),dim} = Q^{-1}\left(\frac{P_{HMI,dim} - P_{faults\ not\ monitored,dim}}{2(N_{fault} + 1)}\right);$$

wherein $K_{FFR(0),dim}$ is a first high border coefficient according to the given dimension dim;

$P_{HMI,dim}$ is the first error value according to the given dimension dim;

$P_{faults\ not\ monitored,dim}$ is the sum of the likelihoods of occurrence of unmonitored faults according to the given dimension dim; and $N_{fault}$ is the corresponding number of monitored faults; and $Q^{-1}(x)$ is said reverse function at the point x.

7. The method according to claim 1, wherein at least some of the computation coefficients, called second low border coefficients and second high border coefficients, are further determined according to the likelihood of occurrence of a fault from among the monitored faults.

8. The method according to claim 7, wherein the second low border coefficients are determined according to the following relationship:

$$K_{FF,dim} = Q^{-1}\left(\frac{P_{HMI,dim} - P_{faults\ not\ monitored,dim}}{p_{fault}^{(j)}}\right);$$

wherein $K_{FF,dim}$ is a second low border coefficient according to the given dimension dim;

$P_{HMI,dim}$ is the first error value according to the given dimension dim;

$P_{faults\ not\ monitored,dim}$ is the sum of the likelihoods of occurrence of unmonitored faults according to the given dimension dim;

j is the index of a monitored fault varying from 1 to $N_{fault}$;

$N_{fault}$ is the number of monitored faults;

$p_{fault}^{(j)}$ the likelihood of occurrence of the fault having index j; and is $Q^{-1}(x)$ is said reverse function at the point x.

9. The method according to claim 7, wherein the second high border coefficients are determined according to the following relationship:

$$K_{FFR,dim} = Q^{-1}\left(\frac{P_{HMI,dim} - P_{faults\ not\ monitored,dim}}{p_{fault}^{(j)}(N_{fault} + 1)}\right);$$

wherein $K_{FFR,dim}$ is a second low border coefficient according to the given dimension dim;

$P_{HMI,dim}$ is the first error value according to the given dimension dim;

$P_{faults\ not\ monitored,dim}$ is the sum of the likelihoods of occurrence of unmonitored faults according to the given dimension dim;

$N_{fault}$ is the corresponding number of monitored faults;

j is the index of a monitored fault varying from 1 to $N_{fault}$;

$P_{fault}^{(j)}$ is the likelihood of occurrence of the fault having index j; and $Q^{-1}(x)$ is said reverse function at the point x.

10. The method according to claim 7, wherein at least some of the computation coefficients, called first low border coefficients, are determined according to the following relationship:

$$K_{FF(0),dim} = Q^{-1}\left(\frac{P_{HMI,dim} - P_{faults\ not\ monitored,dim}}{2}\right);$$

wherein $K_{FF(0),dim}$ is a first low border coefficient according to the given dimension dim;

$P_{HMI,dim}$ is the first error value according to the given dimension dim;

$P_{faults\ not\ monitored,dim}$ is the sum of the likelihoods of occurrence of unmonitored faults according to the given dimension dim; and $Q^{-1}(x)$ is said reverse function at the point x;

wherein at least some of the computation coefficients, called first high border coefficients, are determined according to the following relationship:

$$K_{FFR(0),dim} = Q^{-1}\left(\frac{P_{HMI,dim} - P_{faults\ not\ monitored,dim}}{2(N_{fault} + 1)}\right);$$

wherein $N_{fault}$ is the corresponding number of monitored faults;

wherein during the main phase, the corresponding protection level is determined from the integrity relationship using the dichotomy method starting from a low border and a high border;

the low border being determined as a function of the first and second low border coefficients corresponding to the current number of monitored faults and the given dimension; and the high border being determined as a function of the first and second high border coefficients corresponding to the current number of monitored faults and the given dimension.

11. A computer program product including software instructions which, when implemented by a computer, implement the method according to claim 1.

12. A receptor carrying out the method according to claim 1.

* * * * *